April 10, 1934.  V. G. APPLE  1,954,341
WELDING WIRE LEADS TO COMMUTATOR SEGMENTS
Filed Feb. 24, 1930  2 Sheets-Sheet 1
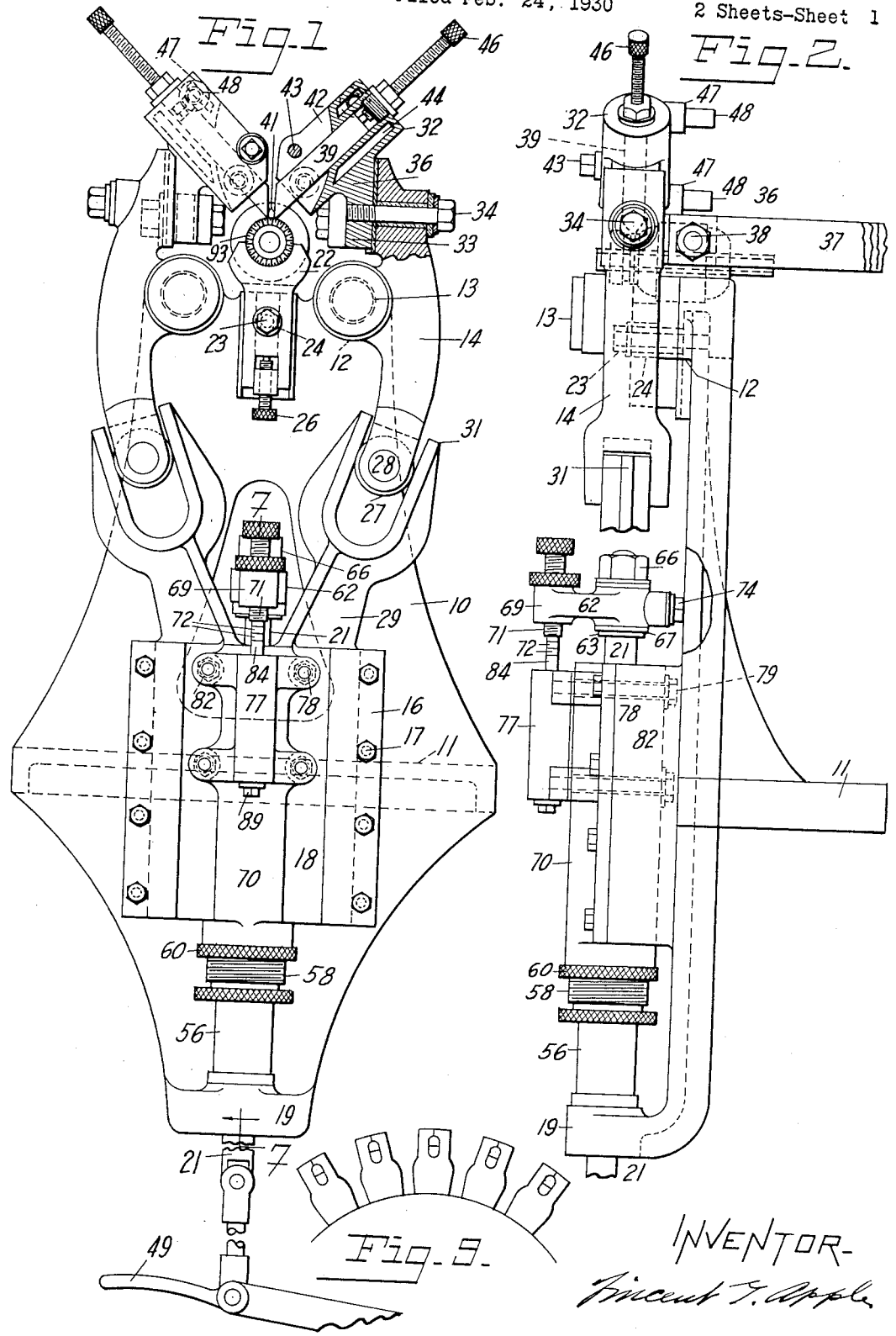

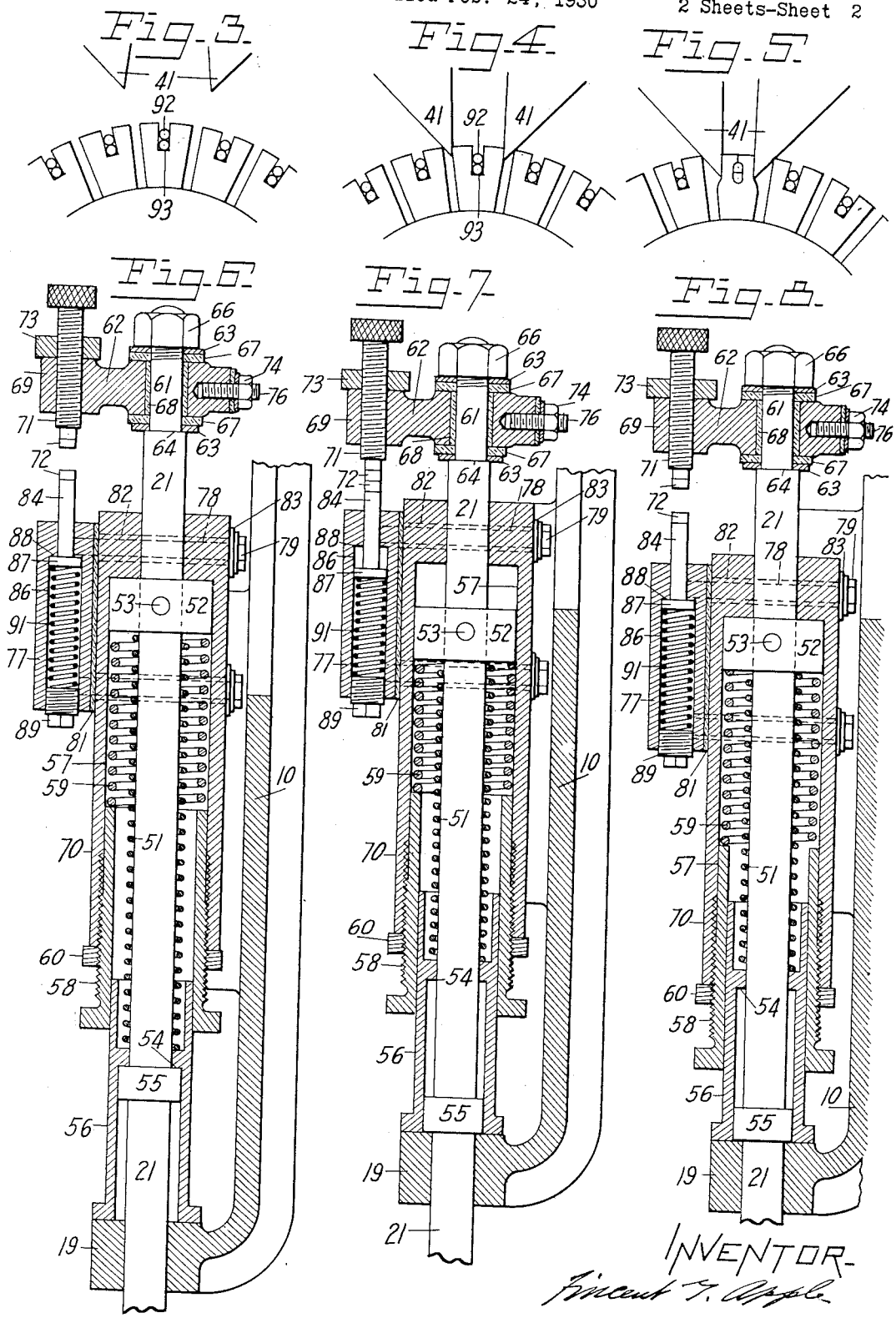

Patented Apr. 10, 1934

1,954,341

UNITED STATES PATENT OFFICE 1,954,341

WELDING WIRE LEADS TO COMMUTATOR SEGMENTS

Vincent G. Apple, Dayton, Ohio; Herbert F. Apple, Edward M. Apple, and Gourley Darroch executors of said Vincent G. Apple, deceased Application February 24, 1930, Serial No. 430,862

7 Claims. (Cl. 219—10)

This invention relates to a process and apparatus for welding the wire leads coming from the ends of armature coils to their respective commutator segments.

The objects of the invention are: first, to improve the mechanical strength of the joints between the leads and the segments; second, to increase the electrical conductivity through such joints; and third, to provide joints capable of withstanding a higher temperature.

I attain these objects by the process and the apparatus hereinafter described, reference being had in the description to the drawings wherein—

Figs. 1 and 2 are front and side elevations respectively of my welding apparatus in its normal unoperated state.

Figs. 3, 4 and 5 show the welding portion of the mechanism to a larger scale in the unoperated, partially operated and fully operated positions respectively.

Figs. 6, 7 and 8 are sections on the line 7—7 of Fig. 1, showing the normal, partial and fully operated position of the switch mechanism.

Fig. 9 is a fragment of an enlarged view of a commutator with one pair of leads welded to the segments.

Similar numerals refer to similar parts throughout the several views.

A frame 10 has a rearwardly extending bracket 11 which is adapted to be secured to the top of a bench or table to hold the frame fixed in the vertical position shown. At the top of frame 10 are two bosses 12 in which are held studs 13 upon which the welding jaws 14 hinge. To the front of the frame two gibs 16 are secured by screws 17. These gibs provide guideways to allow vertical movement of the jaw actuating cam plate 18.

A forwardly extending boss 19 at the bottom of the frame provides a guide for the cam plate operating rod 21. A saddle 22 is secured to the frame at its upper edge by the bolt 23, which passes through an elongated hole 24 in the saddle into a tapped hole in the frame. A thumb screw 26 is provided whereby limited vertical adjustment of the saddle may be had. The upper surface of the saddle is shaped to receive the armature which is to be connected, different saddles being required to interchange with saddle 22 for connecting different armatures.

The jaws 14 are bifurcated at the lower ends to receive the rollers 27 which revolve freely about the studs 28. The angularly extending arms 29 are integral portions of the cam plate 18 and the forked ends 31 straddle the rollers 27 so that vertical movement of the cam plate moves the rollers laterally to operate the jaws 14.

The bit holders 32 have downwardly extending bars 33, whereby they are secured to the upper ends of jaws 14 by screws 34. Lugs 36 extend laterally from ears 33, and heavy flexible conductors 37, each composed of a plurality of thin copper strips are secured to these lugs by bolts 38. Conductors 37 carry the necessarily heavy welding current to the bit holders.

The bit holders 32 are adapted to hold the welding bits 39 and keep them cool. The bits 39 are made of round bar stock cut off at an angle at the end 41, and are held in round openings in the holders. Kerfs 42 extend lengthwise of the holders part way through so that the screws 43 may draw together the split apart halves of the holders to clamp the bit securely.

Water jackets 44 within the holders surround the bits for the full length of the holders except where the jackets are blocked off to make room for the kerfs 42. Adjusting screws 46 are provided to move the bits forward in the holders when required. Hubs 47 receive hose nipple 48, communicating with the water jackets to admit and discharge the cooling medium.

The cam plate operating rod 21 is adapted to be given downward movement by pedal 49, and to be returned to its normal unoperated position by spring 51 pressing upwardly against collar 52, which is fastened to the rod by pin 53. An enlargement 55 of rod 21 limits its vertical movement by contact at the upper end with the shoulder 54 of sleeve 56 and at the lower end with boss 19.

The cam plate 18 is provided with a cylinder 70 having a vertical opening 57, closed at the upper end and open at the lower. Collar 52 is vertically movable freely in this opening. The lower end of opening 57 is threaded, and a correspondingly threaded sleeve 58 extends into the threaded part of the opening. A coil spring 59 is held in compression between collar 52 and sleeve 58. Sleeve 58 may be adjusted vertically and locked in the adjusted position by lock nut 60.

The upper end of rod 21 is reduced in diameter at 61 and the upper circuit closing member 62 is secured to this end although electrically insulated therefrom. Metal washers 63 rest one against shoulder 64 and another under nut 66. Insulation washers 67 and collar 68 insulate the member 62 from the rod. A boss 69 is tapped to receive the vertically adjustable screw 71. Screw 71 has the usual tip 72 of tungsten or other heat resisting metal, and a lock nut 73 to hold it positioned after adjustment. The nut 74 on stud 76 provides clamping means to secure a current carrying wire to the circuit closing member to convey current thereto.

The lower circuit closing member 77 is secured to the front of cam plate 18 by studs 78 and nuts 79. Member 77 is insulated from plate 18 by the sheet insulation 81, and by sleeve 82 of insulation surrounding studs 78, and by washers 83 of insulation under nuts 79. The plunger 84 having another tip 72 of tungsten or similar metal is vertically movable in the opening 86 and is limited in its upward movement by contact of the enlarged end 87 with the shoulder 88. A plug 89 closes the lower end of opening 86 and a spring 91 keeps the plunger 84 raised to the upper limit of its travel.

In operation the armature leads 92 are all driven lightly into place in the connecting slots 93 and the armature is laid in saddle 22. As pedal 49 is depressed, at first the spring 51 alone yields and the cam plate 18 moves downwardly without compressing either of the springs 59 or 91. This continues until bits 39 pinch the slotted end of a commutator segment between them as in Fig. 4 with considerable pressure whereupon the cam plate momentarily ceases to descend further, and the pedal, continuing downward, compresses both springs 51 and 59 until points 72 come together, after which further depression of the pedal compresses the three springs 51, 59 and 91 with the same downward movement until the pedal rod 21 is arrested by the enlargement 55 encountering the boss 19.

Now the electric circuit is so arranged that as soon as the two points 72 come together the welding current passes from one bit 39 through the pinched segment to the other bit 39, and almost instantly the segment softens under the heat of the current. When the segment softens so that the bits 39 can come slightly closer together the spring 59 acting downwardly against the threaded sleeve 58 carries the cam plate 18 downward compressing the segment and by the same movement opening points 72 to shut off the current.

It will be seen that the operator has only to depress the pedal 49 to its lower limit and wait a fraction of a second whereupon the remaining operations automatically take place, that is, the pinching of the segment, the closing of the circuit, the softening and yielding of the segment and the consequent opening of the circuit all naturally and almost instantly follow from the single act of depressing the pedal, and while in the embodiment of my invention herein shown automatic operation of the pedal and automatic indexing of the armature are not included, it is obvious that such mechanism may be readily adapted to the structure shown.

Wire wound armatures of the character to which my invention is applicable ordinarily have their leads soldered to the commutator segments, and while in the past such soldering made as good a joint as required, because the cotton or other fibrous covering on the wire used usually was such as to be destroyed at about the same temperature as that necessary to melt the solder at the joints. But with the advent of magnet wire having asbestos or other high heat resisting insulation, joints capable of resisting similarly high degrees of heat are highly desirable, and it is in connection with such heat resisting windings that my invention is preferably employed.

Having described my invention, I claim—

1. The method of connecting a wire wound armature, which consists of radially slotting the ends of the commutator bars, placing the ends of the wires in said slots, softening the ends of the bars by heat and compressing them about said ends of said wires.

2. The method of connecting a wire wound armature, which consists of radially slotting the ends of the commutator bars, placing the ends of the wires in said slots, applying pressure to the slotted ends of the bars, passing an electric current through the said slotted ends, and maintaining said current until the said ends soften and yield to the said pressure.

3. The method of connecting a wire wound armature, which consists of radially slotting the ends of the commutator bars, placing the ends of the wires in said slots, applying pressing means to the slotted ends of the bars at right angles to said slots, passing an electric current through the said slotted ends while under the said pressure, and maintaining the said current until the said ends soften and yield to the said pressure.

4. The method of connecting a wire wound armature, which consists of cutting radial slots in the ends of the commutator bars, placing the ends of the wires one radially above the other in said slots, applying pressing means to the slotted ends of the bars at right angles to said slots to put said ends in compression, passing an electric current through the said slotted ends while said ends are in compression, and maintaining the said current until the said ends soften and yield and unite with the said wires.

5. For welding wire leads which have been placed one radially above the other in radial slots in the ends of commutator segments to said segments, apparatus comprising, in combination, a frame, a support for an armature on said frame, two laterally movable welding tools supported on said frame and adapted to engage the slotted end of a segment on opposite sides of said slot, camming means to operate said tools to apply pressure to said segment on said opposite sides, pedal means to operate said camming means, a yielding member between said pedal means and said camming means operable to yield when said welding tools apply a certain pressure to said segments whereby said camming means remains stationary while said pedal means may continue its movement, a contact member carried by said camming means adapted to be engaged by another contact member on said pedal means upon further movement of said pedal means to complete an electric circuit through said welding tools and said segment to soften said segment to permit the said pressure of the said welding tools to compress said softened segment together upon said wire leads, and means responsive to movement of said welding tools in effecting said compression to separate the said electrical contact members.

6. The method of connecting a wire wound armature, which consists of dividing the ends of the commutator bars by slots, placing the ends of the wires in said slots, applying a pressure to said divided ends at right angles to said slots, said pressure being insufficient to press said divided ends together about said wires when said ends are cold but sufficient when said ends are softened by heat, connecting an electric circuit through said divided ends to soften said ends, maintaining said pressure and said circuit until said divided ends heat and soften from said current and move together about said wires and breaking said circuit by means of said movement.

7. The method of connecting a wire wound armature, which consists of dividing the ends of the commutator bars by slots, placing the ends of the wires in said slots, applying a pressure to said divided ends at right angles to said slots and closing an electric circuit through said divided ends by the same movement as applies said pressure, said pressure being insufficient to press said divided ends together about said wires when said ends are cold but sufficient when said ends are softened by heat, maintaining said pressure and said circuit until said divided ends heat and soften from said current and move together about said wires, and breaking said circuit by means of said movement.

VINCENT G. APPLE.